United States Patent

Wreesmann et al.

[11] Patent Number: 4,999,401
[45] Date of Patent: Mar. 12, 1991

[54] LINEAR ADDITION POLYMER WITH HYPERPOLARIZABLE SIDE GROUPS

[75] Inventors: Carel T. J. Wreesmann, Arnhem; Erwin W. P. Erdhuisen, Duiven, both of Netherlands

[73] Assignee: Akzo N.V., Netherlands

[21] Appl. No.: 171,550

[22] Filed: Mar. 22, 1988

[30] Foreign Application Priority Data

Apr. 3, 1987 [NL] Netherlands .......................... 8700787

[51] Int. Cl.$^5$ ................................................ C08F 8/00
[52] U.S. Cl. ..................................... 525/279; 525/293; 525/337; 526/265; 526/311
[58] Field of Search ................ 525/279, 293; 526/265, 526/311

[56] References Cited

U.S. PATENT DOCUMENTS 4,801,670  1/1989  De Martino et al. ............... 526/265
4,855,376 10/1989  De Martino et al. ............... 526/311

OTHER PUBLICATIONS

P. Le Barny, et al., SPIE vol. 682, Molecular and Polymeric Optoelectronic Materials: Fundamentals and Applications (1986), pp. 56–64.

Primary Examiner—Bernard Lipman
Attorney, Agent, or Firm—Oliff & Berridge

[57] ABSTRACT

A linear addition polymer having sidegroups which may be coupled to it or not through a spacer and have a molecular hyperpolarizability $\beta$ of at least $10^{-38}$ m$^4$/V, characterized in that the recurring units of the polymer correspond to the formula

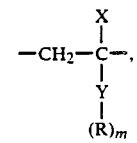

wherein X represents a hydrogen atom or a lower alkyl group and m=1 or optionally 0, where
when m=1
  Y represents a

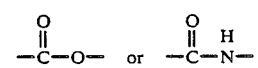

group and R has the meaning of
(a) a hyperpolarizable group having a molecular hyperpolarizability $\beta$ of at least $10^{-38}$ m$^4$/V, in the presence or not of a spacer, and optionally along with
(b) a mesogenic group in the presence or not of a spacer, and/or
(c) a hydrogen atom or a substituted or unsubstituted organic group having not more than 30 carbon atoms, and
when m=0
  Y represents a —CN, a substituted or unsubstituted phenyl group or a group of the formula —OR$_1$ or —CH$_2$OR$_1$, wherein R$_1$ has the meaning of a hydrogen atom or a substituted or unsubstituted aliphatic group having not more than 20 carbon atoms, provided that
at least 10% of the recurring units in the polymer contain a hyperpolarizable group having a molecular hperpolarizability $\beta$ of at least $10^{-38}$ m$^4$/V,
at the most 40% of the recurring units in the polymer contain a mesogenic group, and
that the quotient of the degree of substitution of the recurring units with a group having a molecular hyperpolarizability $\beta$ of at least $10^{-38}$ m$^4$/V and the average molecular weight of R with the meaning given under b and c amounts to at least $5 \times 10^{-4}$, a non-linear optical medium thereof oriented in an electric field and electro-optical laminates comprising such a non-linear optical medium.

8 Claims, No Drawings

LINEAR ADDITION POLYMER WITH HYPERPOLARIZABLE SIDE GROUPS

The invention relates to a linear addition polymer having side groups which may be coupled to it or not through a spacer and have a molecular hyperpolarizability $\beta$ of at least $10^{-38}$ m$^4$/V, and to processes for the preparation of such a polymer, to a non-linear optical medium of such a linear addition polymer oriented in an electric field, and also to electro-optical laminates for the preparation of which use was made of such a non-linear optical medium oriented in an electric field.

Linear addition polymers having side groups of a molecular hyperpolarizability $\beta$ of at least $10^{-38}$ m$^4$/V coupled to them through a spacer are known from an article by Le Barny et al. in SPIE Vol. 682 Molecular and Polymeric Optoelectronic Materials: Fundamentals and Applications (1986) pp. 56–64.

The addition polymers prepared by Le Barny et al. are polyacrylates in which all functional carboxyl groups are coupled through a spacer to hyperpolarizable groups and groups of a mesogenic structure.

Although some of the polyacrylates described in said paper possess a hyperpolarizability density which makes them suitable in principle for application in, for instance, optical switches, in actual practice there is found to be a great need for polymers of an even higher hyperpolarizability density.

The term hyperpolarizability density $D_p$ used in the present specification of the invention refers to the product of the number of hyperpolarizable groups per unit of volume and the molecular hyperpolarizability $\beta$ of these groups.

Owing to the high percentage of mesogenic groups in the known polymers, the relatively high molecular weight of these groups, and the lack of any substantial contribution by these to the hyperpolarizability density, said quantity is in all cases smaller than for instance desired for use on an industrial scale.

Although the presence of said mesogenic groups is intended to provide liquid crystalline polymers by which the value of the second order dielectric (macroscopic) susceptibility $X^{(2)}$ could be increased by a maximum factor of 5 as a result of improved unilateral alignment of the dipoles in a strong electric field, the presence of a relatively high percentage of mesogenic groups having an almost negligible molecular hyperpolarizability $\beta$ results in only partial realization of the envisaged electro-optical effect. Consequently, the electro-optical effect to be attained with the known polymers is still not quite satisfactory for application on an industrial scale.

The invention now has for its object to provide a linear addition polymer having hyperpolarizable groups with which an increased electro-optical effect may be obtained.

The invention comprises a linear addition polymer of the known type mentioned in the opening paragraph the recurring units of the polymer correspond to the formula

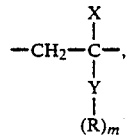

wherein X represents a hydrogen atom or a lower alkyl group and m=1 or optionally 0, and where
when m=1
Y represents a

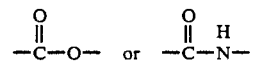

group and R has the meaning of
(a) a hyperpolarizable group having a molecular hyperpolarizability $\beta$ of at least $10^{-38}$ m$^4$/V, in the presence or not of a spacer, and optionally along with
(b) a mesogenic group in the presence or not of a spacer, and/or
(c) a hydrogen atom or a substituted or unsubstituted organic group having not more than 30 carbon atoms, and when m=0
Y represents a —CN, a substituted or unsubstituted phenyl group or a group of the formula —OR$_1$, or —CH$_2$OR$_1$, wherein R$_1$ has the meaning of a hydrogen atom or a substituted or unsubstituted aliphatic group having not more than 20 carbon atoms, provided that
at least 10% of the recurring units in the polymer contain a hyperpolarizable group having a molecular hyperpolarizability $\beta$ of at least $10^{-38}$ m$^4$/V,
at the most 40% of the recurring units in the polymer contain a mesogenic group, and
the quotient of the degree of substitution of the recurring units with a group having a molecular hyperpolarizability $\beta$ of at least $10^{-38}$ m$^4$/V and the average molecular weight of R with the meaning given under b and c amounts to at least $5 \times 10^{-4}$.

It should be noted that linear addition polymers with hyperpolymerizable side groups have earlier been proposed in non-prepublished European patent application No. 230 898. The specified polymers, which are prepared in the examples, exclusively contain side groups having a molecular hyperpolarizability $\beta$ of $0.7 \times 10^{-38}$ m$^4$/V. In the preparation of the addition polymers according to the present invention with side groups having a molecular hyperpolarizability of at least $10^{-38}$ m$^4$/V, use should be made of a wholly different process from the one described in said patent application. Hyperpolarizable groups having a molecular hyperpolarizability $\beta$ of at least $10^{-38}$ m$^4$/V generally contain an electron donor group and an electron acceptor group, both of which are directly coupled to a conjugated $\pi$ electron system. As suitable electron donors may be mentioned the groups —O—, >N— or —S—, with the electron donor being coupled or not to the polymer chain through a spacer. A polymer having a very high electrooptical effect may be obtained when as electron donor is taken an >N-group which is part of a 1,4-piperidinediyl group.

As electron acceptor generally acts an —NO₂, —CN and/or trifluoromethyl group, preferably a nitro group.

For the conjugated π electron system use may with advantage be made of a system which may be represented by the formula

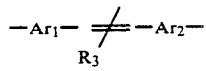

wherein Ar₁ and Ar₂ may be the same or different and represent a divalent aromatic group. Favourable results may also be obtained when in the above formula one or both of the —CH= groups in the vinylene group are replaced with a nitrogen atom. As examples of suitable π-electron systems together with an electron acceptor group may be mentioned groups of the formula

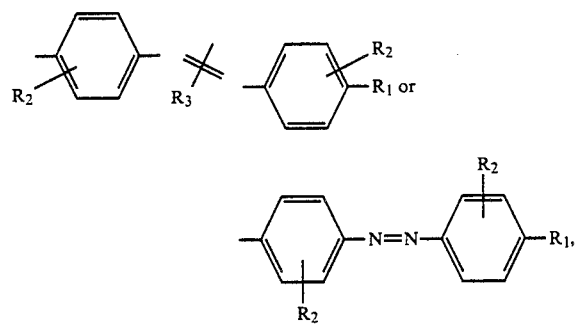

or analogous structures wherein one or more —CH= groups are replaced with atoms of the formula —N=, wherein m=1, 2 or 3 and R₁ represents a nitro, cyano, or trifluoromethyl group and R₂ and R₃ represent a hydrogen atom or halogen atom or a lower alkyl group or alkyloxy group or a nitro, cyano, or trifluoromethyl group. Other examples of suitable π-electron systems together with acceptor groups are compounds of the formula

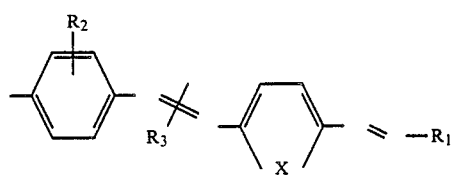

wherein m, n and R₁, R₂ and R₃ may have the above-indicated meaning and X represents an —O—, —S— or —CH₂—CH₂— group.

Instead of representing the afore-mentioned 1,4-phenylene groups Ar₁ and Ar₂ may have the meaning of groups of the following structure:

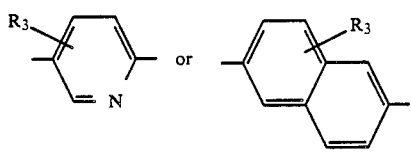

or analogous structures wherein one or more —CH= groups are replaced with atoms of the formula —N=.

The group R in the first-mentioned formula for recurring units may optionally contain a spacer in addition to a hyperpolarizable or a mesogenic group. This will in general be a bifunctional aliphatic compound which may or may not be substituted with one or more groups such as —CH₃, —OCH₃, —CN, and particularly —F.

Suitable bifunctional groups acting as spacers are in general groups which correspond to the formula —(CH₂)$_p$— or —(CH₂CH₂O)$_q$CH₂CH₂—, wherein p represents an integer in the range of 2 to 25 and q=0–4. Also use may with advantage be made of a spacer which wholly or partly forms part of an aliphatic ring system, so that the side chain having the hyperpolarizable group may display the properties of a mesogenic group.

An essential condition according to the invention is that the quotient of the degree of substitution of the recurring units with a group having a molecular hyperpolarizability β of at least $10^{-38}$ m⁴/V and the average molecular weight of R with the meaning given under b and c amounts to at least $5 \times 10^{-4}$. The degree of substitution may vary between 0 and 1. If 10% of the recurring units in the polymer contain a hyperpolarizable group, the degree of substitution amounts to 0:1.

Examples of mesogenic groups which may optionally be contained in the linear addition polymers according to the invention are discussed by Ringsdorf et al. in Makromol. Chem. 185, pp. 1335–1360 (1984). They are preferably groups of the formula —O—Ar₁—(COO)-$_n$—Ar₂, wherein n=0 or 1 and Ar₁ and Ar₂ may have the same meaning as indicated above. The group Ar₂ is preferably substituted in the p-position with a —CN or —OCH₃ group. Furthermore, substituents may also be present in a different position, such as —CH₃, —OCH₃, —F, —Cl, —Br, or —CN.

Compounds having mesogenic groups are further described in Kirk-Othmer, Encyclopedia of Chemical Technology, 3$^{rd}$ edition (1981), Volume 14, pp. 395–423.

Well-known examples of mesogenic groups are:

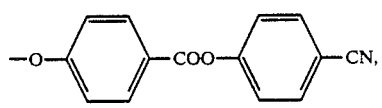

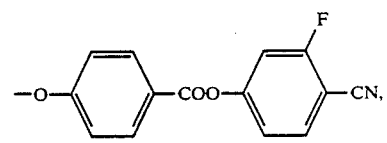

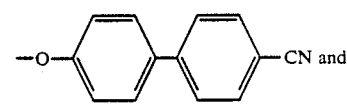

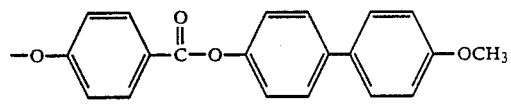

When in the first-mentioned formula for the recurring units of the linear addition polymers according to the invention, m=0, Y may also have the meaning of an —OR₁ or —CH₂OR₁ group, wherein R₁ stands for a substituted or unsubstituted aliphatic group having not more than 20 carbon atoms. As possible substituents may be mentioned —CH₃, —OCH₃, —F, —Cl, —Br or —CN. Preference is then given to polymers in which $R_1$ stands for a lower alkyl group which may optionally be substituted with one or more fluorine atoms.

In the linear addition polymers according to the invention R may, in addition to a hyperpolarizable or mesogenic group or hydrogen, represent a substituted or unsubstituted organic group having not more than 30 carbon atoms. Preference is then given to a lower substituted or unsubstituted aliphatic or cyclo-aliphatic group, which may or may not be substituted with a —$CH_3$, —$OCH_3$, —F, —Cl, —Br or —CN group.

According to the invention preference is given to linear addition polymers composed of recurring units, at least 25% of which contains a hyperpolarizable group having a molecular hyperpolarizability β of at least $10^{-38}$ $m^4$/V. Of course, hyperpolarizable groups of lower molecular hyperpolarizability may also be present.

Optimum results have been obtained using polymers in which nearly all the recurring units contain a hyperpolarizable group.

The linear addition polymers according to the invention generally possess a hyperpolarizability density higher than that of the known polymers with hyperpolarizable groups. It has been found that with the polymers according to the invention a hyperpolarizability density may be obtained which is equal to or higher than $10^{-11}$ m/V. Preference is given then to polymers having a hyperpolarizability density of at least $10^{-10}$ m/V.

Furthermore, the invention relates to a process for the preparation of linear addition polymers of the known type mentioned in the opening paragraph, with the recurring units-forming, hyperpolarizable, nitro group-containing monomers being polymerized in the presence of a radical initiator.

Such a process is also known from the afore-mentioned article by Le Barny. A disadvantage of the process mentioned in this article is the low yield in the case of polymerization of about 10% of monomer in a solvent such as benzene, toluene, or dimethyl formamide at a molar ratio of monomers to radical initiator of about 60 and at a temperature of 60° to 80° C. over a period of 24 to 60 hours. Use was made of 2,2'-azoisobutyronitrile as radical initiator.

The invention provides a process for the preparation of linear addition polymers of the afore-mentioned known type with which even in the presence of a high percentage of hyperpolarizable groups having polymerization-hindering nitro groups a virtually complete conversion may be obtained.

The invention consists in that in a process of the afore-mentioned known type the amount of radical initiator is constantly replenished during the polymerization process, and the total amount of initiator added during the reaction is 0:1 to 2 equivalents, calculated on the amount of monomer added.

Another process for the preparation of a linear addition polymer of the known type mentioned in the opening paragraph is characterized in that first in a manner known from chemical technology a homopolymer or copolymer is prepared, use being made of (meth)acryloyl chloride and optionally of substituted or unsubstituted styrene, (meth)acrylonitrile, or a compound of the formula

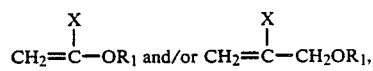

wherein X and $R_1$ have the above-mentioned meaning, and in that the resulting polyacid chloride in the presence of an acid binder is wholly or partly converted, in a manner known from chemical technology, with an —OH, —$NH_2$, or >NH group-containing functional compound which further contains a hyperpolarizable group, a mesogenic group, or an organic group having at the most 30 carbon atoms.

For the preparation of poly(meth)acryloyl chloride or copolymers thereof use may be made of a process described by Schulz et al. in Makromol. Chem. 42 (1960), pp. 189-196. The conversion of the polyacid chloride with an —OH, —$NH_2$ or >NH group-containing functional compound is carried out in the presence of an acid binder such as triethylamine or pyridine in a solvent such as tetrahydrofuran or 1,2-dichloroethane.

The linear polymers according to the present invention are excellently suitable for uses where a high $X^{(2)}$ is of importance, such as laser light modulation, frequency doubling, optical switches, information storage, etc.

The invention will be further described in but not limited by the following examples.

EXAMPLE I a. Preparation of 4-hydroxy-4'-nitrostilbene

A mixture of 181 g of 4-nitrophenyl acetic acid, 122 g of 4-hydroxybenzaldehyde, 0:8 l of mesitylene, and 0:2 l of piperidine was stirred for 90 minutes at 120° C. under a nitrogen atmosphere.

After cooling to 60° C. the reaction mixture was poured into a mixture of 1 l of 2N HCl and 1 l of petroleum ether (boiling point 80°-100° C.). Following filtration and washing with 2 l of water the crude product was dried and then crystallized from 2 l of ethanol (100%).

Obtained were 190 g of 4-hydroxy-4'-nitrostilbene having a melting point of 209° C.

b. Preparation of 4-(6-hydroxyhexyloxy)-4'-nitrostilbene

A mixture of 120:5 g of 4-hydroxy-4'-nitrostilbene, 103:5 g of anhydrous potassium carbonate, 8:3 g of potassium iodide, 120 ml of 6-chlorohexanol-1, and 1 l of dimethyl formamide (DMF) was boiled for 30 minutes with refluxing. After cooling the reaction mixture was poured into 2:5 l of 2N HCl. The resulting precipitate was separated by filtration and washed with 5 l of water. The crude product after drying was crystallized from 3 l of toluene. Obtained were 130 g of 4-(6-hydroxyhexyloxy)-4'-nitrostilbene with a melting point of 118° C.

c. Preparation of 4-(6-hydroxyhexyloxy)-4'-nitrostilbene acrylate ester

To a mixture cooled down to 0° C. of 102:3 g of 4-(6-hydroxyhexyloxy)-4'-nitrostilbene, 0:25 g of 2,6 ditertiary butyl-4-methyl phenol, 800 ml of dichloromethane, and 63 ml of triethylamine was added dropwise with stirring and over a period of 30 minutes a solution of 30 ml of acryloyl chloride in 200 ml of dichloromethane.

The reaction mixture was then stirred for 1 hour at 25° C., after which 20 ml of methanol were added. The dichloromethane solution was washed with 400 ml of 1M NaHCO$_3$ solution. After drying the organic layer with magnesium sulphate it was concentrated by evaporation. The residue was crystallized from a mixture of 900 ml of acetone and 600 ml of ethanol. Obtained were 100 g of 4-(6-hydroxyhexyloxy)-4'-nitrostilbene acrylate ester with a melting point of 135° C.

d. Polymerization of 4-(6-hydroxyhexyloxy)-4'-nitrostilbene acrylate ester

A solution of 100 g of 4-(6-hydroxyhexyloxy)-4'-nitrostilbene acrylate ester in 1 l of ortho-dichlorobenzene was stirred for 4 hours at 100° C. under nitrogen, in the process of which 8 portions of 4 g of 2,2'-azobisisobutyronitrile (AIBN) were added at 30-minute intervals. The progress of the polymerization process was followed by HPLC. On conclusion of the polymerization process the reaction mixture was cooled and subsequently poured into 10 l of petroleum ether (boiling point 60°–80° C.).

Following decanting the precipitated oil was dissolved in 0:5 l of dichloromethane and again poured into 10 l of petroleum ether (boiling point 60°–80° C.).

After filtration and drying there were obtained 100 g of polymer having the following properties:

| | |
|---|---|
| Tg | = 71° C. |
| λ$_{max}$ | = 376 nm |
| *M$_w$ (average molecular weight) | = 6600 |
| Dp | = 4.9 × 10$^{-11}$ m/V | calculated on a molecular hyperpolarizability β for the 4-oxy-4'-nitrostilbene group of 2:7×10$^{-38}$ m$^4$/V.

EXAMPLE II

In a manner analogous to that in Example I several acrylate esters were prepared having the formula

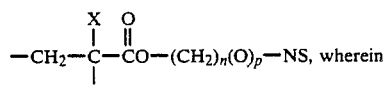

NS has the meaning of a nitrostilbene group. The properties of the resulting polymers are shown in the table below.

TABLE 1

| Polymer | n | p | X | $\overline{M}_w$ | Tg(°C.) | Dp(m/V) · 10$^{-11}$ |
|---|---|---|---|---|---|---|
| 1 (of Example I) | 6 | 1 | H | 6600 | 71 | 4.9 |
| 2 | 0 | 0 | H | 6300 | 110 | 6.6 |
| 3 | 3 | 1 | H | 6200 | 82 | 5.5 |
| 4 | 6 | 1 | CH$_3$ | 3500 | 45 | 4.8 |
| 5 | 8 | 1 | H | 7000 | 57 | 4.6 |
| 6 | 10 | 1 | H | 3500 | 45 | 4.3 |

EXAMPLE III a. Preparation of 4-(4-hydroxypiperidino)-4'-nitrostilbene

A solution of 123 g of 4-(4-hydroxy)piperidinobenzaldehyde (obtained in accordance with the procedure described by Taylor et al. in Synthesis, (1982), p. 606), 163 g of 4-nitrophenyl acetic acid, and 60 ml of piperidine in 2000 ml of dimethyl formamide was stirred for 48 hours at 25° C. The resulting reaction mixture was fully concentrated by evaporation at 80° C., after which the residue was titrated with 2 portions of 1000 ml of petroleum ether (boiling point 40°–60° C.). The next step consisted in 10 minutes boiling with refluxing in 1500 ml of ethanol, with the precipitate hardly dissolving. After cooling to 0° C. the reaction mixture was kept at that temperature for 16 hours, after which the precipitate was isolated by filtration and subjected to a second washing treatment with 500 ml of ethanol.

Obtained were 140 g of 4-(4-hydroxypiperidino)-4'-nitrostilbene having a melting point of 248° C.

b. Preparation of 4-(4-hydroxypiperidino)-4'-nitrostilbene acrylate ester

To a solution of 130 g of 4-(4-hydroxypiperidino)-4'-nitrostilbene, 800 mg of 2,6 ditertiary butyl-4-methyl phenol, 1600 ml of dichloromethane, and 84 ml of triethylamine was added dropwise with stirring at 25° C. over a period of 30 minutes a solution of 48 ml of acryloyl chloride in 400 ml of dichloromethane, after which the reaction mixture was stirred for a further 16 hours. Subsequently, 30 ml of methanol were added, after which the reaction mixture was washed with 1000 ml of 1M NaHCO$_3$ solution. After the organic layer had been dried with magnesium sulphate, the mixture was concentrated by evaporation. The residue was purified by recrystallization from a mixture of 1000 ml of dichloromethane and 500 ml of acetone.

Obtained were 100 g of 4-(4-hydroxypiperidino)-4'-nitrostilbene acrylate ester having a melting point of 199° C.

c. Polymerization of 4-(4-hydroxypiperidino)-4'-nitrostilbene acrylate ester

In a manner analogous to that in Example I 100 g of the acrylate ester were dissolved in 1000 ml of ortho-dichlorobenzene and then stirred for 5 hours under nitrogen at 100° C., with 10 portions of 4 g of 2,2'-azobisisobutyronitrile (AIBN) added at 30-minute intervals.

After cooling the reaction mixture was poured into 10 l of petroleum ether (boiling point 60°–80° C.). A precipitate was formed which was separated by filtration, dissolved in 500 ml of dichloromethane, and again poured into 10 l of petroleum ether (boiling point 60°–80° C.). Following filtration and drying there were obtained 100 g of an orange-coloured powder with an $\overline{M}_w$ (average molecular weight) of 8600 and a Dp of 24×10$^{-11}$ m/V. A glass transition temperature Tg was found to be 160° C.

EXAMPLE IV a. Preparation of 1-trityloxy-6-chlorohexane

A mixture of 111 g of trityl chloride, 1 l of dichloromethane, 58:5 ml of 6-chlorohexanol-1, 67 ml of triethylamine, and 0:5 g of dimethyl aminopyridine was stirred for 4 hours at 25° C. After washing the dichloromethane solution with a solution of 400 ml of 1M NaHCO$_3$ and 400 ml of water the organic layer was dried with magnesium sulphate and concentrated by evaporation. To the residue were then added 200 ml of methanol, after which part of it was evaporated. The resulting crystalline precipitate was separated and after-washed with 50 ml of methanol.

Obtained were 110 g of 1-trityloxy-6-chlorohexane.

b. Preparation of 4-(6-hydroxyhexyloxy)piperidine

To a mixture of 7 g of sodium hydride and 200 ml of dimethyl formamide (DMF) was added dropwise with stirring at 25° C. over a period of 30 minutes a solution of 25 g of N-acetyl-4-hydroxypiperidine in accordance with the procedure given by Mc Manus et al. in J. Med. Chem. (1965), p. 766, and 2:9 g of potassium iodide in 200 ml of DMF. To this was added dropwise over a period of 10 minutes a solution of 100 g of 1-trityloxy-6-chlorohexane in 200 ml of DMF. The reaction mixture was then stirred for another 24 hours at 25° C. and next concentrated by evaporation to about 200 ml at reduced pressure and 75° C. The residue was poured into 200 ml of water and 200 ml of dichloromethane. Following isolation of the organic layer the layer of water was once more extracted with 200 ml of dichloromethane. After having been combined, the organic layers were dried with magnesium sulphate and concentrated by evaporation. To the resulting oil were added 400 ml of 4N HCl, after which the reaction mixture was boiled with refluxing for 16 hours. After cooling the reaction mixture was extracted twice, each time with 100 ml of ether. Then the layer of water was neutralized with an excess (about 80 g) of NaOH pellets to pH >12. The basic solution was extracted with 5 portions of 200 ml of dichloromethane. The combined dichloromethane layers were dried with magnesium sulphate and concentrated by evaporation to an oil which crystallized out slowly. Obtained were 20 g of 4-(hydroxyhexyloxy) piperidine.

c. Preparation of 4-(4-(6-hydroxyhexyloxy)-piperidino)-4'-nitrostilbene

A mixture of 20 g of 4-(6-hydroxyhexyloxy)piperidine, 12 ml of fluorobenzaldehyde, 13:8 g of potassium carbonate and 160 ml of acetonitrile was boiled with refluxing for 48 hours under nitrogen. After cooling the reaction mixture was poured into 300 ml of water and 100 ml of dichloromethane. Following isolation of the organic layer the layer of water was extracted twice, each time with 100 ml of dichloromethane. After having been combined, the organic layers were dried and then concentrated by evaporation to an oil (about 30 g). After 30 g of 4-nitrophenyl acetic acid, 10 ml of piperidine and 400 ml of DMF had been added, the mixture was stirred for 48 hours at 25° C. Next, the reaction mixture was fully concentrated by evaporation at 80° C. The residue was titrated 3 times with petroleum ether (boiling point 40°-60° C.). After concentration by evaporation and drying there were obtained 24 g of 4-(4-(6-hydroxyhexyloxy)piperidino)-4'-nitrostilbene.

d. Preparation of 4-(4-(6-hydroxyhexyloxy)-piperidino)-4'-nitrostilbene acrylate ester To a mixture cooled down to 0° C. of 21 g of 4-(4-(6-hydroxyhexyloxy)piperidino)-4'-nitrostilbene, 40 mg of 2,6-ditertiary butyl-4-methyl phenol, 160 ml of dichloromethane, and 10:5 ml of triethylamine was added dropwise with stirring over a period of 30 minutes a solution of 5 ml of acryloyl chloride in 40 ml of dichloromethane. Stirring of the reaction mixture was continued for 16 hours at 25° C. Following the addition of 4 ml of methanol the dichloromethane solution was washed with 100 ml of 1M NaHCO$_3$. After drying with magnesium sulphate the organic layer was concentrated by evaporation. The residue was crystallized from a mixture of 100 ml of acetone and 50 ml of ethanol. Obtained were 16 g of 4-(4-(6-hydroxyhexyloxy)-piperidino)-4'-nitrostilbene acrylate ester.

e. Polymerization of 4-(4-(6-hydroxyhexyloxy)-piperidino)-4'-nitrostilbene acrylate ester To a solution stirred at 100° C. of 4-(4-(6-hydroxyhexyloxy)-piperidino)-4'-nitrostilbene acrylate ester in ortho-dichlorobenzene were added over a period of 5 hours at 30-minute intervals 10 portions of 400 mg of AIBN. After cooling the reaction mixture was poured into 1 l of petroleum ether (boiling point 60°-80° C.). The precipitate was separated, dissolved in 50 ml of dichloromethane, and again poured into 1 l of petroleum ether (boiling point 60°-80° C.). Following filtration and drying 10 g of an orange-red powder were obtained.

In determining the properties an $\lambda_{max}$ was measured at 418 nm, with an $\overline{M}_w$ (average molecular weight) of 5800 being found.

For the Dp a value of $19 \times 10^{-11}$ m/V was obtained. The Tg was found to be 74° C.

EXAMPLE V

In a manner analogous to that in Example IV several acrylate esters were prepared having the formula

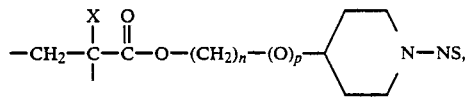

wherein NS has the meaning of a nitrostilbene group. The properties of the resulting polymers are shown in the table below.

TABLE 2

| Polymer | n | p | X | $\overline{M}_w$ | Tg(°C.) | Dp(m/V) · 10$^{-11}$ |
|---|---|---|---|---|---|---|
| 1 | 0 | 0 | H | 7800 | 160 | 24 |
| 2 | 0 | 0 | CH$_3$ | 2000 | 115 | 23.1 |
| 3 | 2 | 0 | H | 9500 | 112 | 22.3 |
| 4 | 10 | 1 | H | 8500 | 50 | 17.0 |

EXAMPLE VI a. Preparation of 1M solution of polyacryloyl chloride in 1,2-dichloroethane A solution of 8:1 ml of freshly distilled acryloyl chloride in 92 ml of 1,2-dichloroethane was, after the addition of 1:1 g of 2,2'-azobis-2,4-dimethyl valeronitrile (AVN), stirred for 24 hours at 55° C. under dry nitrogen. Next, another portion of 1:1 g of AVN was added and stirred for 24 hours at 55° C. under dry nitrogen. On conclusion of the polymerization reaction a clear, pale brown solution was obtained.

b. Reaction of polyacryloyl chloride with 4-(8-hydroxyoctyloxy)-4'-nitrostilbene In a manner analogous to that given in Example Ib 4-(8-hydroxyoctyloxy)-4'-nitrostilbene was prepared. To a solution of 9:2 g of this compound and 7 ml of triethylamine in 175 ml of dichloroethane were added dropwise with stirring over a period of 30 minutes at 25° C. 25 ml of the 1M polyacryloyl chloride solution as prepared under a. Subsequently, the reaction mixture was still stirred for 24 hours at 25° C. Following the addition of 200 ml of water the mixture was vigorously stirred for one more hour at 25° C., after which the organic layer was isolated, washed with 200 ml of water, and next concentrated by evaporation until a dry residue was obtained. This residue was introduced into 100 ml of dichloromethane and poured into 0:5 l of petroleum ether (boiling point 40°–60° C.). The resulting precipitate was isolated by separation. The yield was 5 g. By gel exclusion HPLC the average molecular weight $\overline{M}_w$ was found to be 13,000. By titration an acid value of 1:38 mmole/g was determined. The molar ratio of ester to acid groups therefore was 3:2. For the Dp a value of $3.4 \times 10^{-11}$ m/V was found.

EXAMPLE VII

Reaction of polyacryloyl chloride with 4-(4-(6-hydroxyhexyloxy)piperidino)-4'-nitrostilbene To a solution of 10:6 g of 4-(4-(6-hydroxyhexyloxy)-piperidino)-4'-nitrostilbene (prepared in accordance with Example IIIc) and 7 ml of triethylamine in 225 ml of dichloroethane were added dropwise with stirring over a period of 30 minutes at 25° C. 25 ml of a 1M solution of polyacryloyl chloride in dichloroethane. Subsequently, the reaction mixture was stirred for 24 hours at 25° C.

Following the addition of 200 ml of water the mixture was vigorously stirred for a further hour at 25° C., after which the organic layer was isolated, subjected to a second washing treatment with 200 ml of water, and then concentrated by evaporation until a dry residue was obtained. This residue was introduced into 100 ml of dichloromethane and poured into 0:5 ml of petroleum ether (boiling point 40°–60° C.). The resulting product was separated by filtration. The yield was 4:5 g. By gel exclusion HPLC the average molecular weight $\overline{M}_w$ was found to be 8700. The acid value (determined by titration) was 1:65 mmole/g. The molar ratio of ester to acid groups was therefore 10:9. For the Dp a value of $13.9 \times 10^{-11}$ m/V was found. The polymer displayed a (nematic) liquid crystalline behaviour between 100° and 170° C.

EXAMPLE VIII

Copolymerization of 4-(8-hydroxyoctyloxy)-4'-nitrostilbene acrylate ester and methyl methacrylate in the molar ratio of 1:1

A solution of 10:5 g of 4-(8-hydroxyoctyloxy)-4'-nitrostilbene acrylate ester and 2,65 ml of methyl methacrylate in 100 ml of ortho-dichlorobenzene was stirred for 4 hours at 100° C. under nitrogen, in the process of which 8 portions of 0:4 g of 2,2'-azobisisobutyronitrile (AIBN) were added at 30-minute intervals. The progress of the polymerization process was followed by HPLC. On conclusion of the polymerization process the reaction mixture was cooled and subsequently poured into 1 l of petroleum ether (boiling point 60°–80° C.).

Following decanting the precipitated oil was dissolved in 50 ml of dichloromethane and again poured into 1 l of petroleum ether (boiling point 60°–80° C.).

After filtration and drying there were obtained 100 g of polymer having the following properties:

| | |
|---|---|
| Tg | = 44° C. |
| λmax | = 376 nm |
| $\overline{M}_w$ (average molecular weight) | = 6900 |
| Dp | = $3.7 \times 10^{-11}$ m/V | calculated on a molecular hyperpolarizability $\beta$ for the 4-oxy-4'-nitrostilbene group of $2.7 \times 10^{-38}$ m$^4$/V.

EXAMPLE IX

Copolymerization of 4-(8-hydroxyoctyloxy)-4'-nitrostilbene acrylate ester and methyl methacrylate in the molar ratio of 1:2

A solution of 10:5 g of 4-(8-hydroxyoctyloxy)-4'-nitrostilbene and 5:3 ml of methyl methacrylate was prepared in a manner analogous to that in Example VIII. Obtained were 14 g of polymer having the following properties:

| | |
|---|---|
| Tg | = 51° C. |
| λmax | = 376 nm |
| $\overline{M}_w$ (average molecular weight) | = 6200 |
| Dp | = $3.1 \times 10^{-11}$ m/V | calculated on a molecular hyperpolarizability $\beta$ for the 4-oxy-4'-nitrostilbene group of $2.7 \times 10^{-38}$ m$^4$/V.

EXAMPLE X

Copolymerization of 4-(6-hydroxyhexyloxy)-4'-nitrostilbene acrylate ester and 4-(hydroxyhexyloxy)-4'-methoxybiphenyl acrylate ester in the molar ratio of 2:1

A solution of 10 g of 4-(6-hydroxyhexyloxy)-4'-nitrostilbene acrylate ester and 4:4 g of 4-(6-hydroxyhexyloxy)-4'-methoxybiphenyl acrylate ester in 100 ml of orthodichlorobenzene was stirred for 4 hours at 100° C. under nitrogen, in the process of which 8 portions of 0:4 g of 2,2'-azobisisobutyronitrile (AIBN) were added at 30-minute intervals. The progress of the polymerization process was followed by HPLC. On conclusion of the polymerization process the reaction mixture was cooled and subsequently poured into 1 l of petroleum ether (boiling point 60°–80° C.).

Following decanting the precipitated oil was dissolved in 50 ml of dichloromethane and again poured into 1 l of petroleum ether (boiling point 60°–80° C.).

After filtration and drying there were obtained 14 g of polymer. Above the glass transition temperature, which was found to be 48° C., the polymer displayed a liquid crystalline behaviour (nematic phase).

| | |
|---|---|
| $\overline{M}_w$ (average molecular weight) | = 6700 |
| Dp | = $3.3 \times 10^{-11}$ m/V | calculated on a molecular hyperpolarizability $\beta$ for the 4-oxy-4'-nitrostilbene group of $2.7 \times 10^{-38}$ m$^4$/V.

We claim:

1. A linear addition polymer having side groups which possess a molecular hyperpolarizability of at least $10^{-38}$ m$^4$/V, wherein the recurring units of the polymer correspond to the formula

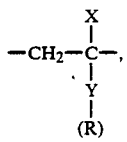

wherein X represents a hydrogen atom or a lower alkyl group and
Y represents a

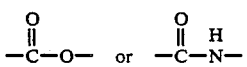

group wherein Y is attached by a carbon atom to the polymer chain and R is at least one member selected from the group consisting of (a) a hyperpolarizable group having a molecular hyperpolarizability $\beta$ of at least $10^{-38}$ m$^4$/V, optionally with a spacer, (b) a hydrogen atom or a substituted or unsubstituted organic group having not more than 30 carbon atoms, provided that nearly all recurring units contain a hyperpolarizable group, the hyperpolarizable group having a molecular hyperpolarizability $\beta$ of at least $10^{-38}$ m$^4$/V comprising a conjugated $\pi$-electron system of the formula

wherein Ar$_1$ and Ar$_2$ may be the same or different and represent a divalent aromatic group, A and B are the same or different and represent CH or N, and wherein R' is selected from the group consisting of hydrogen, halogen, lower alkyl, lower alkoxy, nitro, cyano and trifluoromethyl.

2. A linear addition polymer according to claim 1, characterized in that at least 25% of the recurring units contain a hyperpolarizable group having a molecular hyperpolarizability $\beta$ of at least $10^{-38}$ m$^4$/V.

3. A linear addition polymer according to claim 1, characterized in that the spacer is a group corresponding to the formula —(CH$_2$)$_p$— or —[CH$_2$CH$_2$O]$_q$CH$_2$CH$_2$—, wherein p represents an integer in the range of 2 to 25 and q=0–4.

4. A linear addition polymer according to claim 3, characterized in that the spacer is wholly or partly fluorinated.

5. A linear addition polymer according to claim 1, characterized in that it has a hyperpolarizability density $Dp \geq 10^{-11}$ m/V.

6. A linear addition according to claim 1, characterized in that it has a hyperpolarizability density $Dp \geq 10^{-10}$ m/V.

7. The linear addition polymer of claim 1, wherein said hyperpolarizable group possesses a maximum of 2 aromatic groups.

8. The linear addition polymer of claim 1, wherein A and B each represents CH.

* * * * *

UNITED STATES PATENT AND TRADEMARK OFFICE
CERTIFICATE OF CORRECTION

PATENT NO. : 4,999,401

DATED : March 12, 1991

INVENTOR(S) : Carel T. J. WREESMANN; and Erwin W. P. ERDHUISEN

It is certified that error appears in the above-identified patent and that said Letters Patent is hereby corrected as shown below:

Col. 1, line 66, after "paragraph" add -- wherein --;

Col. 2, line 49, change "patent application" to -- Patent Application --;

line 52, change "0:7" to -- 0.7 --;

line 63, change ">N" to -- $\rangle$N --;

line 66, change "electrooptical" to -- electro-optical --;

line 67, change ">N" to -- $\rangle$N --.

Col. 4, line 23, change "0:1" to -- 0.1 --.

Col. 5, line 59, change "0:1" to -- 0.1 --.

Col. 6, line 6, change ">NH" to -- $\rangle$NH --;

line 18, change ">NH" to -- $\rangle$NH --;

line 33, change "0:8" to -- 0.8 --;

line 33, change "0:2" to -- 0.2 --;

line 48, change "120:5" to -- 120.5 --;

line 49, change "103:5" to -- 103.5 --;

line 49, change "8:3" to -- 8.3 --;

line 53, change "2:5" to -- 2.5 --;

line 62, change "102:3" to -- 102.3 --;

line 63, change "0:25" to -- 0.25 --.

UNITED STATES PATENT AND TRADEMARK OFFICE
CERTIFICATE OF CORRECTION

PATENT NO. : 4,999,401

DATED : March 12, 1991

INVENTOR(S) : Carel T. J. WREESMANN; and Erwin W. P. ERDHUISEN

It is certified that error appears in the above-identified patent and that said Letters Patent is hereby corrected as shown below:

Col. 7, line 24, change "0:5" to -- 0.5 --;

line 31, corresponding to "*$M_w$", insert the footnote -- *The $M_w$ was determined by gel exclusion HPLC, the calibration curve being plotted using a series of polystyrene standard samples of a known molecular weight. --;

line 35, change "2:7" to -- 2.7 --.

Col. 8, line 58, change "58:5" to -- 58.5 --;

line 59, change "0:5" to -- 0.5 --.

Col. 9, line 8, change "2:9" to -- 2.9 --;

line 36, change "13:8" to -- 13.8 --;

line 52, change "hydroxyhexyloxy)piperidino)" to -- hydroxyhexyloxy)-piperidino) --;

line 58, change "hydroxyhexyloxy)piperidino)" to -- hydroxyhexyloxy)-piperidino) --;

line 60, change "10:5" to -- 10.5 --.

Col. 10, line 50, change "8:1" to -- 8.1 --;

line 52, change "1:1" to -- 1.1 --;

line 54, change "1:1" to -- 1.1 --;

line 63, change "9:2" to -- 9.2 --.

Col. 11, line 6, change "0:5" to -- 0.5 --;

line 11, change "1:38" to -- 1.38 --;

UNITED STATES PATENT AND TRADEMARK OFFICE
CERTIFICATE OF CORRECTION

PATENT NO. : 4,999,401
DATED : March 12, 1991
INVENTOR(S) : Carel T. J. WREESMANN; and Erwin W. P. ERDHUISEN Page 3 of 4

It is certified that error appears in the above-identified patent and that said Letters Patent is hereby corrected as shown below:

line 13, change "3:4" to -- 3.4 --;
        line 19, change "10:6" to -- 10.6 --;
        line 33, change "0:5" to -- 0.5 --;
        line 35, change "4:5" to -- 4.5 --;
        line 38, change "1:65" to -- 1.65 --;
        line 39, change "10:9" to -- 10.9 --;
        line 40, change "13:9" to -- 13.9 --;
        line 49, change "10:5" to -- 10.5 --;
        line 50, change "2,65" to -- 2.65 --;
        line 53, change "0:4" to -- 0.4 --.
Col. 12, line 6, change "2:7" to -- 2.7 --;
        line 14, change "10:5" to -- 10.5 --;
        line 15, change "5:3" to -- 5.3 --;
        line 28, change "2:7" to -- 2.7 --;
        line 36, change "4:4" to -- 4.4 --;
        line 41, change "0:4" to -- 0.4 --;
        line 63, change "2:7" to -- 2.7 --;

IN THE CLAIMS:

Col. 12, claim 1, line 65, change "side groups" to -- sidegroups --.

UNITED STATES PATENT AND TRADEMARK OFFICE
CERTIFICATE OF CORRECTION

PATENT NO. : 4,999,401

DATED : March 12, 1991

INVENTOR(S) : Carel T. J. WREESMANN; and Erwin W. P. ERDHUISEN

It is certified that error appears in the above-identified patent and that said Letters Patent is hereby corrected as shown below:

Col. 14, claim 5, line 26, change "$\geq$" to -- $\geq$ --;

claim 6, line 29, change "$\geq$" to -- $\geq$ --.

Signed and Sealed this

Nineteenth Day of January, 1993

Attest:

DOUGLAS B. COMER

*Attesting Officer*      *Acting Commissioner of Patents and Trademarks*